United States Patent Office 3,506,691
Patented Apr. 14, 1970

3,506,691
PROCESS FOR THE PRODUCTION OF DERIVATIVES OF STEROIDIC 3 - β - HYDROXY - 4,6 - DIOLEFINS
Romana Jaworska, Wamawa, Ksieeia Yamssa 16/22 m. 23, and Marian Kocor, Landomierska 6 m. 1, both of Warsaw, Poland
No Drawing. Filed Dec. 20, 1967, Ser. No. 691,977
Claims priority, application Poland, Dec. 20, 1966, P 118,066; Nov. 9, 1967, P 123,832
Int. Cl. C07c 167/16
U.S. Cl. 260—397.2                                      8 Claims

ABSTRACT OF THE DISCLOSURE

A process for producing steroidic 3-β-hydroxy-4,6-diolefins by reacting a corresponding 7-halogenated steroid with a compound of basic character in the presence of a mercury compound as a catalyst and an organic amine in an inert organic solvent.

BRIEF SUMMARY OF THE INVENTION

The invention is directed to a process for the production of derivatives of steroidic 3-β-hydroxy-4,6-diolefins of the general formula:

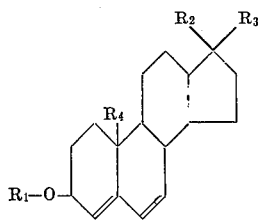

I in which $R_1$ is hydrogen, alkyl, aralkyl, phenyl or acyl, $R_2$ is hydrogen, hydroxyl, akyl, alkoxy, acyloxy, acetyl, hydroxy-acetyl, alkoxyacetyl, acyloxyacetyl or 2-(4-keto)-tetrahydrofuryl, $R_3$ is hydrogen, a free or esterified hydroxyl group or alkyl and wherein $R_2$ may form with $R_3$ an oxygen bridge, and $R_4$ is hydrogen or methyl.

These derivatives constitute important intermediate products in the synthesis of biologically active steroidic 4,6-diolefins, e.g. in the synthesis of 6-dehydroprogesterone.

The known method of obtaining derivatives of the general Formula I consists in the dehydrohalogenation or splitting off of halogen hydrogen from the convenient 7-halogen steroids by heating with alkali metal carbonates for 2–4 hours. This reaction results in obtaining an isomeric mixture of steroidic 3-β-hydroxy-5,7-diolefin. From this mixture the latter compound is separated as a main product with a yield of 15–40%.

The method of splitting off hydrogen bromide from 7-bromocholesteryl benzoate with the acid of 2,6-lutidine, to obtain cholestadiene-4,6-ol-3β benzoate with a yield of 65%, is also known.

Apart from the splitting off of the halogen hydrogen, the separation of steroidic 4,6-diolefin from the obtained mixture of isomers is difficult and requires repeated crystallization.

It has been found that splitting off of the halogen hydrogen can be carried out with the aid of compounds of basic character in a selective manner, if a catalyst in form of mercury compounds in the presence of an organic amine is used. A steroidic 4,6-diolefin with a high yield of the order of about 80–90% can then be obtained.

According to the invention, a mixture is formed of a steroidic 7-halogen-3β-hydroxy-5-ene or its ether or ester of the general formula:

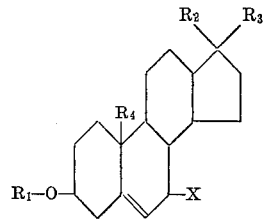

II in which $R_1$, $R_2$, $R_3$ and $R_4$ are of the same meaning as given above for Formula I and X stands for a halogen atom, with a compound or mixture of compounds of basic character in the presence of a mercury compound as a catalyst and an organic amine in a medium of an inert organic solvent at room or elevated temperature.

Suitable compounds of basic character for splitting off the halogen hydrogen are oxides, hydroxides or inert alkali metal or alkali earth metal salts of a weak acid, ammonia, ammonium hydroxide, or an ammonium salt of a weak acid.

Suitable catalysts are compounds of mono- or divalent mercury such as mercuric or mercurous oxide or halides. The organic amine is a tertiary amine such as pyridine, α-picoline, symmetric collidine and the like.

The inert organic solvent may be an aromatic, or a saturated alicyclic or cyclic hydrocarbon. Ketones, esters and aliphatic ethers may also be used. Of special advantage are benzene or toluene in carrying out the reaction at boiling temperature of the reaction mixture.

The reaction is effected within a temperature range of 15–150° C., the reaction being shorter than in known methods and amounting to about half an hour at a temperature of near 100°. It has been found that a longer heating of the resultant thermolabile steroid, particularly above 120°, leads to partial decomposition of the product and to the formation of triene derivatives.

It is of advantage to effect the process in an atmosphere of inert gas, particularly nitrogen, in order to protect the easily oxidizing products and substrate of the reaction. After cooling of the reaction mixture, the excess of the starting steroidic compound, the formed inorganic salts, the catalyst and the tertiary amine are separated in a known manner and the product is isolated ordinarily by evaporation of the solvent and is thereafter cleaned by crystallization.

DETAILED DESCRIPTION

The invention will be described in detail with reference to the following examples:

EXAMPLE I 11.4 g.of α-picoline stabilized 7-bromocholesterol benzoate were dissolved in 50 ml. of toluene and then added to a mixture, heated to 110°, of 7.5 g. of anhydrous sodium carbonate and 0.1 g. of mercurous chloride (calomel) in 200 ml. of toluene. The resulting mixture was heated under a reflux condenser at a boiling temperature for 15–20 minutes, while thoroughly stirring and passing through the mixture a nitrogen stream. Then the reaction mixture was cooled, the inorganic salts were filtered off and the deposit was washed with toluene several times. The filtrate was added to the washings and the solvents were entirely evaporated under decreased pressure at a temperature of 35–40°. Acetone was added to the remainder and after stirring, the solution was left at a temperature of −10° for crystallization. After the crystallized deposit was filtered off, washed with acetone and dried, there was obtained about 8.5 g. of cholestadiene- 4,6-ol-3β-benzoate with a melting point of 122–124° and maximum absorption $$E_{1\,cm.}^{1\%} \text{ at } \lambda \text{ 240 m}\mu = 680$$

giving a theoretical yield of 87%. The ultra-violet absorption spectrum of the obtained product established the absence of admixtures with cholestadiene-5,7-ol-3β benzoate.

EXAMPLE II

A toluene solution of 7-bromo-17α-methylandrostendiol benzoate, obtained by allyl bromination of 7.3 g. of methylandrostendiol benzoate, was dropped within 3 minutes into a boiling mixture of 15 g. of anhydrous sodium carbonate, 0.05 g. of mercuric chloride (sublimate) and 0.5 g. ml. of α-picoline in 100 ml. of toluene. The mixture was refluxed with thorough stirring in a nitrogen atmosphere for 30 minutes, whereupon the mixture was cooled to room temperature and the inorganic salts were filtered off. The deposit was washed twice with 30 ml. of toluene each time and the filtrate, together with the washings, was thickened in a thin layer vacuum evaporator to an oily residue which was dissolved in 30 ml. of acetone. The solution was then subjected to a temperature of −5° for 24 hours, and the crystallized deposit was filtered off, washed with cold acetone and then dried. There was obtained 3.95 g. of 17α-methyl-androstadiene-4,6-diol-3,17 with a melting point of 154–156°. This is a yield of about 83% in relation to 7-bromo-17α-methylandrostendiol benzoate (54% of yield in relation to methylandrostendiol benzoate). The ultra-violet spectrum of the obtained compound shows the exclusive presence of a coupled system of double bonds in the positions 4,6.

After recrystallization from acetone 3.3 g. of pure compound with a melting point of 158–160° and $$E_{1\,cm.}^{1\%} \text{ at } \lambda \text{ 233 m}\mu = 772$$

were obtained.

EXAMPLE III

Into a boiling mixture of 100 ml. of toluene, 7.5 g. of anhydrous sodium carbonate, 2.05 g. of mercuric chloride (sublimate) and 4 ml. of symmetric collidine, a solution in toluene of 7-bromoandrostenol acetate obtained by allyl bromination of 2.95 g. of androstenol acetate, was dropped during 5 minutes. The mixture was then refluxed in a nitrogen atmosphere for 25 minutes while thorough stirring of the substrates was maintained during the entire reaction period. After cooling, the reaction mixture was filtered and inorganic salts were washed, while the filtrate together with washings were washed with a 5% hydrochloric acid solution and then with water to neutral reaction. The solution was dried over anhydrous sodium sulphate and concentrated under decreased pressure to an oily reisdue. This residue was dissolved in 30 ml. of acetone and refrigerated for 48 hours at a temperature of −5°. The crystallized deposit was filtered off and washed with cool methanol and then dried. 13 g. of androstadien-4,6-ol-3β-ol-17 acetate with a melting point of 142–145° were obtained. The ultra-violet spectrum showed a maximum absorption within the range of 232, 238 and 248 mμ, characteristic for 17⁴·⁶-diolefins.

$$E_{1\,cm.}^{1\%} \text{ at } \lambda \text{ 238 m}\mu = 740$$

The yield was 44% in relation to androstenolone acetate (about 68% in relation to 7-bromoandrostenolone acetate).

EXAMPLE IV 100 ml. of toluene, 20 g. of anhydrous potassium acetate and 0.05 g. of mercurous chloride were mixed together, heated to boiling and there was added to the refluxed mixture, a solution of 7.12 g. 7-bromocholesterol benzoate and 0.03 ml. of symmetric collidine in 15 ml. of toluene for 5 minutes. Stirring and heating was continued for 25 minutes, then the mixture was cooled to room temperature and the salt deposit was filtered off. The filtrate was concentrated in a vacuum evaporator to an oily residue, 10 ml. of acetone was added and cooled to a temperature of −15° for crystallization. The crystals were filtered off and washed with cold acetone, and were dried at room temperature. The filtrate was concentrated to ⅓ of volume, and frozen again for a second crystallization. There were obtained in the first and second crystallization 5.42 g. of raw product with a melting point of 122–124° and $$E_{1\,cm.}^{1\%} \text{ 750 at } \lambda \text{ max. 240}$$

The yield is 89.5%.

What is claimed is:
1. A process for the manufacture of derivatives of steroidic 3β-hydroxy-4,6-diolefins of the formula:

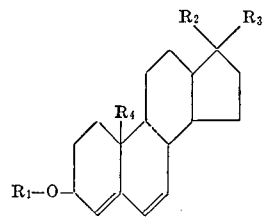

in which $R_1$ is hydrogen, alkyl, aralkyl, phenyl or acyl, $R_2$ is hydrogen, hydroxyl, alkyl, alkoxy, acyloxy, acetyl, hydroxyacetyl, acyloxyacetyl or 2-(4-keto)-tetrahydrofuryl, $R_3$ is hydrogen, free or esterified hydroxyl or alkyl and wherein $R_2$ may form with $R_3$ an oxygen bridge, and $R_4$ is hydrogen or methyl, said process comprising: dehydrohalogenating a steroidic 7-halogen-3β-hydroxy-5-ene or ether or ester thereof of the formula:

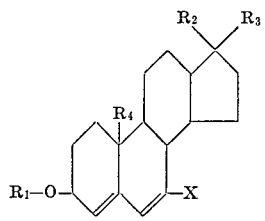

II in which $R_1$, $R_2$, $R_3$ and $R_4$ have the same meaning as above and X is a halogen, by the steps including reacting the halogenated steroidic compound with a compound of basic character in the presence of a mercury compound as as catalyst and an organic amine in an inert organic solvent.

2. A process as claimed in claim 1, wherein said compound of basic character is an oxide, hydroxide or inert alkali metal or alkali earth metal salt of a weak acid, ammonia, ammonium hydroxide, or an ammonium salt of a weak acid.

3. A process as claimed in claim 1, wherein said inert organic solvent is an aromatic or aliphatic alicyclic or cyclic hydrocarbon.

4. A process as claimed in claim 1, wherein the reaction is effected at a temperature between 15 and 150°.

5. A process as claimed in claim 1, wherein said mercury compound is an oxide or halide of monovalent or divalent mercury.

6. A process as claimed in claim 1, wherein said mercury compound is a mercurous halide.

7. A process as claimed in claim 1, wherein said organic amine is a tertiary amine.

8. A process as claimed in claim 7, wherein said tertiary amine is pyridine, α-picoline, or symmetric collidine.

References Cited

UNITED STATES PATENTS 3,249,628   5/1966   Wiechert _____ 260—397.5

ELBERT L. ROBERTS, Primary Examiner

U.S. Cl. X.R.

260—239.55, 397.4, 397.47, 397.5